United States Patent
Ishii

(10) Patent No.: US 7,714,966 B2
(45) Date of Patent: May 11, 2010

(54) LIQUID CRYSTAL DISPLAY WITH COMMON ELECTRODE HAVING CROSS SHAPED ALIGNMENT MEMBERS

(75) Inventor: Toshiya Ishii, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 604 days.

(21) Appl. No.: 11/152,390

(22) Filed: Jun. 15, 2005

(65) Prior Publication Data

US 2005/0280761 A1 Dec. 22, 2005

(30) Foreign Application Priority Data

Jun. 21, 2004 (JP) .............................. 2004-182849

(51) Int. Cl.
G02F 1/1337 (2006.01)
G02F 1/1339 (2006.01)

(52) U.S. Cl. ...................... 349/129; 349/157

(58) Field of Classification Search .................. 349/129
See application file for complete search history.

(56) References Cited

U.S. PATENT DOCUMENTS

| 6,567,144 | B1 * | 5/2003 | Kim et al. .................... 349/128 |
| 6,778,244 | B2 * | 8/2004 | Song et al. .................. 349/129 |
| 6,967,702 | B2 * | 11/2005 | Ishii et al. .................... 349/123 |
| 2001/0020992 | A1 * | 9/2001 | Takeda et al. ................ 349/130 |
| 2001/0026347 | A1 * | 10/2001 | Sawasaki et al. ............ 349/156 |
| 2003/0011734 | A1 * | 1/2003 | Liu et al. ..................... 349/129 |
| 2003/0030769 | A1 * | 2/2003 | Hong et al. .................. 349/129 |
| 2004/0001167 | A1 * | 1/2004 | Takeuchi et al. .............. 349/38 |
| 2004/0070714 | A1 * | 4/2004 | Ishii et al. .................... 349/129 |
| 2005/0088597 | A1 * | 4/2005 | Maeda et al. ................ 349/139 |

FOREIGN PATENT DOCUMENTS

| JP | 2001-249340 | 9/2001 |
| JP | 2001-264773 | 9/2001 |
| KR | 2002-079583 | 10/2002 |

* cited by examiner

Primary Examiner—David Nelms
Assistant Examiner—Jessica M Merlin
(74) Attorney, Agent, or Firm—McGinn IP Law Group, PLLC

(57) ABSTRACT

A picture electrode of an MVA liquid crystal display device has a configuration where sub-picture electrodes are successively provided, while a cross-shaped slit is provided as an alignment restriction member on a common electrode of the side of a counter substrate. A columnar spacer is provided on a signal line of a TFT substrate in conformity to a position of a singular point of an alignment of liquid crystal molecules, the singularity occurring in a display region. This structure makes it possible, when a panel surface is depressed, to cause quick re-aligning of the liquid crystal molecules at the singular point of +1, as a base point, which has occurred at a center of the cross-shaped slit and in the vicinity of the columnar spacer, hence achieving a speedy recovery of displaying.

18 Claims, 12 Drawing Sheets

LIQUID CRYSTAL DISPLAY WITH COMMON ELECTRODE HAVING CROSS SHAPED ALIGNMENT MEMBERS

BACKGROUND OF THE INVENTION

1. Field of the Invention

The present invention relates to a liquid crystal display device and particularly to a multi-domain vertical alignment liquid crystal display where a columnar spacer is provided on a wiring part.

2. Description of the Related Art

A liquid crystal display device has various features of the thin type, lightness, and low power consumption, or the like. The liquid crystal display devices have been widely used as not only the display monitor for a personal computer, a word processor, office automation (OA) equipment, personal digital assistance (PDA), and an in-vehicle navigation but also a display device of the LCD TV, and the like.

The display operation mode of a liquid crystal device, which is currently used most, is a normally white mode using a twisted nematic (TN) liquid crystal.

The liquid crystal display includes electrodes which are respectively formed on the opposed faces of two sheets of glass substrates placed opposite to each other, and alignment films formed on the both electrodes. The two alignment films are processed for aligning in the directions perpendicular to each other by means of rubbing and the like. On the outer face of each substrate, a polarization plate which is adjusted with the polarization axis is disposed so as to be in parallel with the rubbing direction of the alignment film on the respective substrates.

When a nematic liquid crystal with positive dielectric anisotropy is inserted in between these substrates, liquid crystal molecules contacting with the alignment film are aligned along the rubbing direction, and the alignment directions of the liquid crystal molecules on the both substrates are orthogonal. The liquid crystal molecules between the both substrates, then, align in a direction perpendicular to the faces of the substrates, as they rotate their alignment directions in sequence within a plane in parallel to the faces of the substrates.

Subsequently, the liquid crystals are aligned between the substrates with the angle of 90 degrees twisted.

For a TN liquid crystal display device having such a structure, light entering at the face of one substrate passes through a polarization plate, and enters a liquid crystal layer. When passing through the liquid crystal layer, the direction of polarized light is rotated by 90 degrees along the twist of the liquid crystal molecules, and the light passes through a polarization plate of the other substrate having the polarization axis which is perpendicular to that of the one substrate. This produces a display in a brightness state when no voltage is applied.

When a voltage is applied to common electrodes, a long axis of the nematic liquid crystal molecules with positive dielectric anisotropy is aligned in a direction perpendicular to a substrate face, hence eliminating the twist. For the straight polarized light which enters the liquid crystal layer in this state, the liquid crystal molecules do not exhibit refractive index anisotropy, whereby the polarizing direction of the entered light does not change. As a result, the light cannot pass through the other polarization plate. This produces a light in a darkness state when a predetermined maximum volt is applied. When putting back into a state where no voltage is applied, a display in a brightness state is back due to an alignment regulation force. Displaying in gray scale is made possible by controlling the inclinations of the liquid crystal molecules while varying the applying voltage, and thereby changing transmission optical power from the other polarization plate.

A TN-TFT liquid crystal display device is a display device of an active matrix type where a thin film transistor (TFT) is provided on each picture element as a switching element to control an applying voltage between common electrodes for every picture element. Since the TN-TFT liquid crystal display device is thin and light, and is provided with a large screen and a high resolution, it has been widely used for a display monitor of a personal computer, a portable television, or the like.

While enhancement of display quality is expected in such applications, the TN-TFT liquid crystal display device has a problem where an angular field of view provided thereby is narrow. As a technology for solving a problem related to the characteristic of an angular field of view of the TN liquid crystal display device, a vertical alignment (VA) mode liquid crystal has drawn attention. In the VA mode liquid crystal, in comparison with TN mode liquid crystal, which has been adopted in a number of liquid crystal display devices, a display quality in black is high, and alignment processing such rubbing is not necessary. Among the VA modes, a multi-domain vertical alignment (MVA) mode liquid crystal display device (hereinafter, referred to as MVA liquid crystal display device) has especially drawn attention because it can achieve a wide angular field of view. The MVA liquid crystal display device has not only been applied to a transmission liquid crystal display, but is also beginning to be applied to a reflection liquid crystal display device and a semi-transmission liquid crystal display device.

Various technologies have been disclosed with respect to alignment control technologies for an MVA liquid crystal display device. In Japanese Patent Laid-open No. 2001-249340 (hereinafter, referred to as Patent Literature 1), there is disclosed an MVA liquid crystal display device in which a singular point (+1 or −1) formed in an alignment vector field for liquid crystal molecules is controlled, and decreasing of transmissivity is curbed, thereby improving a response characteristic. This singular point is defined as a point where, among liquid crystal molecules, one in the middle is vertically aligned, while the other liquid crystal molecules are fallen down and aligned. When vertically seeing a liquid crystal layer from above, a singular point where liquid crystal molecules around the singularity fall down toward the singular point or draw away therefrom is called a singular point of +1 (hereinafter, referred to as +1 singular point) in an alignment vector field for the liquid crystal molecules. Meanwhile, a singular point where some of liquid crystal molecules around the singular point fall down toward the ssingular point and the other draw away therefrom is called a singular point of −1 (hereinafter, referred to as −1 singular point) in an alignment vector field for the liquid crystal molecules.

FIG. 1 is a plan view of a face of a liquid crystal display device for explaining a prior art on an alignment control technology in Patent Literature 1. FIGS. 2, 3, and 4 are sectional views taken along the lines I-I, II-II, and III-III, respectively. As shown in FIG. 1, at a +1 singular point 10, a liquid crystal molecule 6 is aligned toward a point, while, at a −1 singular point 11, some of the molecules are oriented in directions different from a point. Referring FIGS. 2 to 4, on the opposed faces of a lower substrate 20 and a upper substrate 21, both of which are placed opposite to each other with a predetermined space therebetween, a picture electrode 3 and a common electrode 7 are formed, respectively. On the picture electrode 3 and the common electrode 7, vertical alignment films (not shown) are formed. Between the upper and lower substrates, liquid crystal molecules 6 with negative dielectric anisotropy are inserted. On the picture electrode 3 and the common electrode 7, a protruding structure 9 and a protruding structure 8 are respectively formed as control parts on singular points for the alignment of liquid crystal molecules. The protruding structure 8 has a cross-shape when it is seen in a direction perpendicular to the face of the substrate. The protruding structures 8 are disposed in such a manner that the cross-shaped parts are adjacent one another at predetermined intervals. When voltages are applied to the picture electrode 3 and the common electrode 7 in such a liquid crystal display, a distortion is formed in an electric field where voltages applied through the protruding structure 8 and the protruding structure 9. Because of this distortion in the electric field, the alignment of liquid crystals is restricted on the protruding structure 8, the protruding structure 9, and in the vicinity thereof. As shown in FIG. 1, in the middles of the protruding structure 8 and the protruding structure 9, +1 singular point 10 are formed, while −1 singular point 11 are formed at ends of the protruding structure 8.

In Japanese Patent Laid-open No. 2001-264773 (hereinafter, referred to as Patent Literature 2), there is disclosed an MVA liquid crystal display device where non-uniformity in a gap between the substrates is reduced, and thereby a display quality is improved. In this liquid crystal display device, as shown in FIG. 5, for a pair of substrates which are placed opposite for achieving a multi-domain, a plurality of waveform protrusions 22 are formed on at least one of the opposed faces of the pair of substrates. A waveform protrusion 22 has a continuous triangular waveform in one direction. In a second direction crossing the above direction, a plurality of columnar spacers 24 are disposed. The columnar spacers 24 work as keeping the distance between the pair of substrates to be constant, and are disposed on a shaft passing angles of the waveform protrusions 22. A configuration designed in such a manner is expected to be able to prevent occurrence of non-uniformity in gap. The waveform protrusions are contained in a concept of a singular point control part for the liquid crystal molecules alignment. In FIG. 5, reference numeral 23 indicates a picture element formed on a color filter (not shown).

In recent years, applying of an MVA liquid crystal display device to a mobile phone and a personal digital assistance has been considered. In such an application, a transparent touch panel may be provided for inputting information by pressing a liquid crystal panel with a finger or a pen point.

As in Patent Literature 2, when the waveform protrusion 22 is formed of a triangular waveform, singular points may be placed anywhere on a line of the waveform protrusion 22, and are the positions thereof are not to be determined at once. So long as it is on the line of the protrusion, electric potential is the same, and thus, there is no specific location in terms of electric potential. Since liquid crystal molecules are successively aligned, unless the positions of the singular points for the alignment of liquid crystal molecules are determined, the alignment of liquid crystal molecules in another region will not be determined. Therefore, it requires a certain period of time until the alignment of liquid crystal molecules in a picture element comes to a final state. In Patent Literature 2, there arises a problem where, when a panel surface of a liquid crystal display device is depressed, a wavy alignment irregularity occurs in liquid crystal molecules, and it takes a time in the order of seconds until restoring.

Furthermore, in the prior art of Patent Literature 1, singularities for the alignment of liquid crystal molecules, the singularities occurring on a signal line, are controlled by thickening or thinning a part of an electrode used for a signal line. The position of the singular point for the alignment of the liquid crystal molecule is influenced easily by the difference of the pattern formation accuracy when the signal line is formed in such a method. As a result, a parasitic capacitance between a signal line and a picture electrode tends to vary for every picture element, and thereby a flicker tends to occur. In addition, since the columnar spacers are not provided, a change in gap occurring when a panel surface is depressed is large, thus causing a wavy alignment irregularity in the liquid crystal molecules.

SUMMARY OF THE INVENTION

Therefore, an object of the invention is to solve the problems inherent in the above-described MVA liquid crystal display device.

A liquid crystal display device in the present invention is an MVA liquid crystal display device, and includes a first substrate, a second substrate disposed opposite to the first substrate, and a liquid crystal layer with negative dielectric anisotropy which is held between the first substrate and the second substrate. The first substrate includes a wiring part formed by a plurality of signal lines and a plurality of scanning lines both crossing each other, picture electrodes respectively provided in the regions zoned with the signal lines and the scanning lines, and switching elements provided to every picture element. The second substrate includes common electrodes. A common electrode is provided thereon with a cross-shaped first alignment restriction member, which works, when a voltage is applied between a picture electrode and a common electrode, to restrict the alignment of the liquid crystal molecules on a liquid crystal layer. A columnar spacer is provided on the wiring part. A position on the above wiring part where the columnar spacer is provided is located in the middle of the two neighboring first alignment restriction members.

In the above-described liquid crystal display device of the present invention, it is possible to design a configuration such that a picture element is a structure where a plurality of sub-picture electrodes are provided in succession, and a first alignment restriction member is disposed to face the sub-picture electrode. Alternatively, a columnar spacer may be provided on the first substrate or on the second substrate. In the above-described liquid crystal display device of the present invention, it is possible to design a configuration such that a first alignment restriction member provided on the common electrode is formed by an electrode non-existing portion of the common electrode or a protruding structure provided on the common electrode.

In the above-described liquid crystal display device of the present invention, when a picture element is a structure where a plurality of sub-picture electrodes are provided in succession, a second alignment restriction member is provided in the form of a protruding structure at a position where it laps over a signal line or a scanning line and on a common electrode which does not lap over a columnar spacer.

The above-described liquid crystal display device of the present invention may be a semi-transmission liquid crystal display device that includes a reflection part in an area of a picture element.

In the above-described liquid crystal display device of the present invention, a cross-shaped slit is provided in a common electrode or an alignment restriction member of a cross-shaped protruding structure is provided on a common electrode, and a columnar spacer is provided on a signal line part, hence leading to the following advantageous effects.

(1) A display region is divided into four regions where the alignment directions of liquid crystal molecules are different in a sense that the alignment directions thereof in every two neighboring regions make the angle of 90 degrees, and the position of a singular point in an alignment vector field for the liquid crystal molecules is restricted in a two-dimensional manner.

(2) In the signal line part, a singular point in an alignment vector field for liquid crystal molecules is generated around a columnar spacer due to the presence of a diagonal electric field generated around the cylindrical spacer, hence controlling the alignment of the liquid crystal molecules of the signal line part.

(3) Consequently, when a liquid crystal panel is depressed, re-aligning of the liquid-crystal molecules, is quickly settled. In addition, non-uniformity in a parasitic capacitance between the signal line and the picture electrode is reduced, hence preventing occurrence of flickers.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

The present invention is described in detail below with reference to the drawings.

Figure 1:
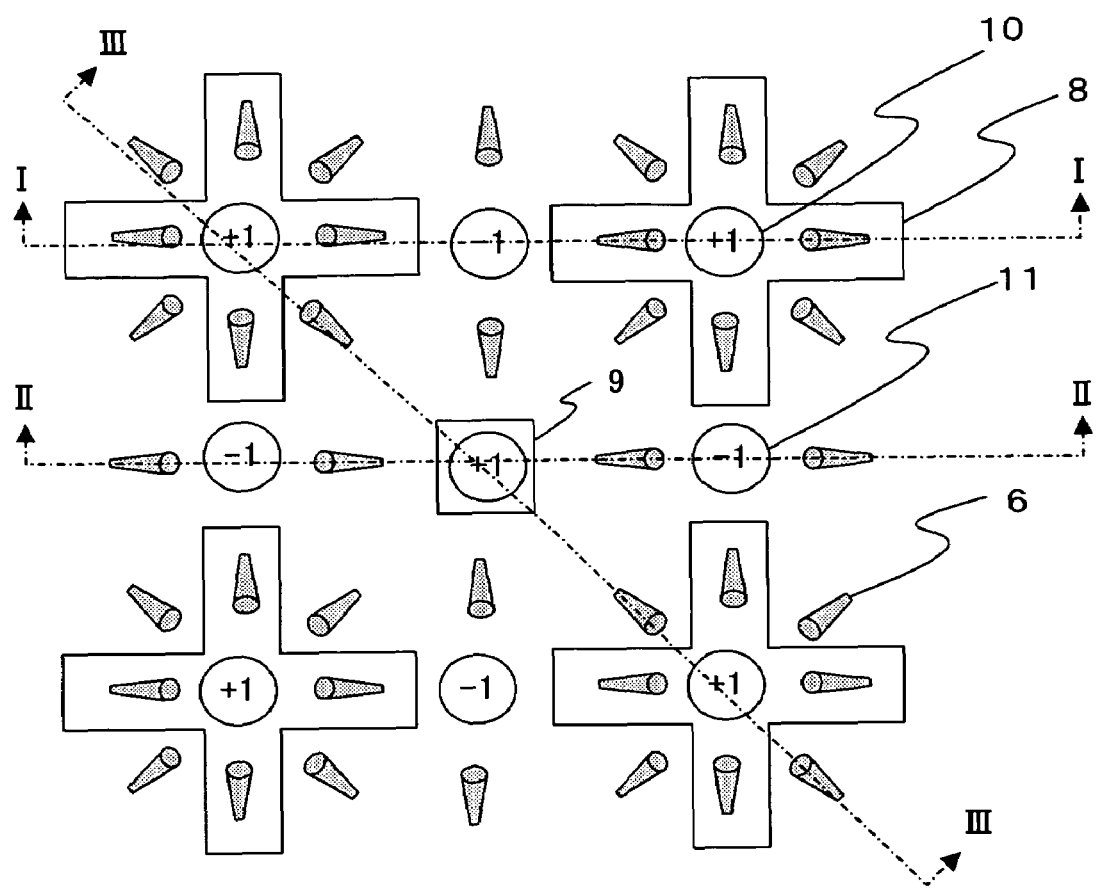
FIG. 1 is a plan view for explaining an example of an alignment control technology of a conventional liquid crystal display device.
Figure 2:
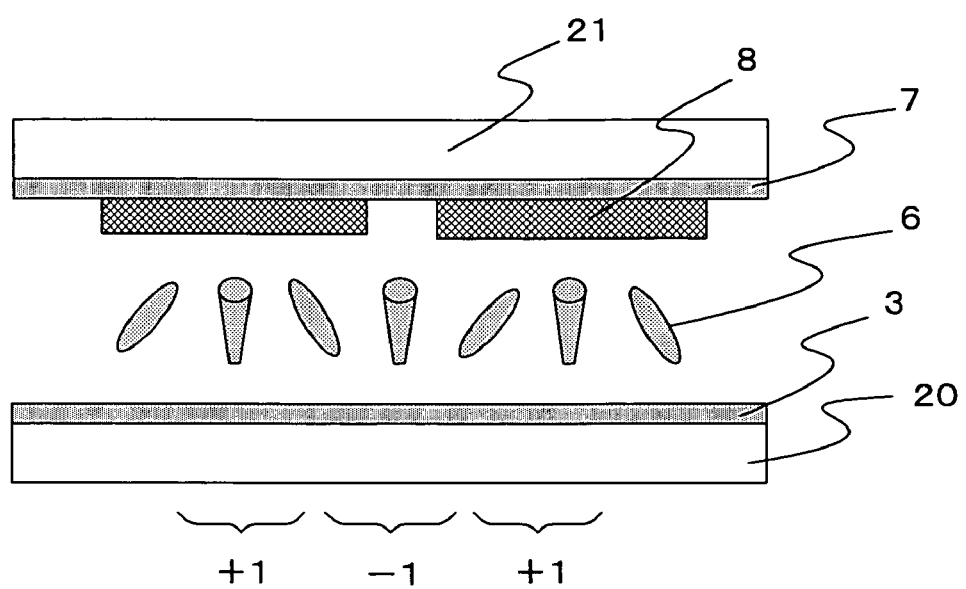
FIG. 2 is a cross-sectional view taken along the line I-I in FIG. 1.
Figure 3:
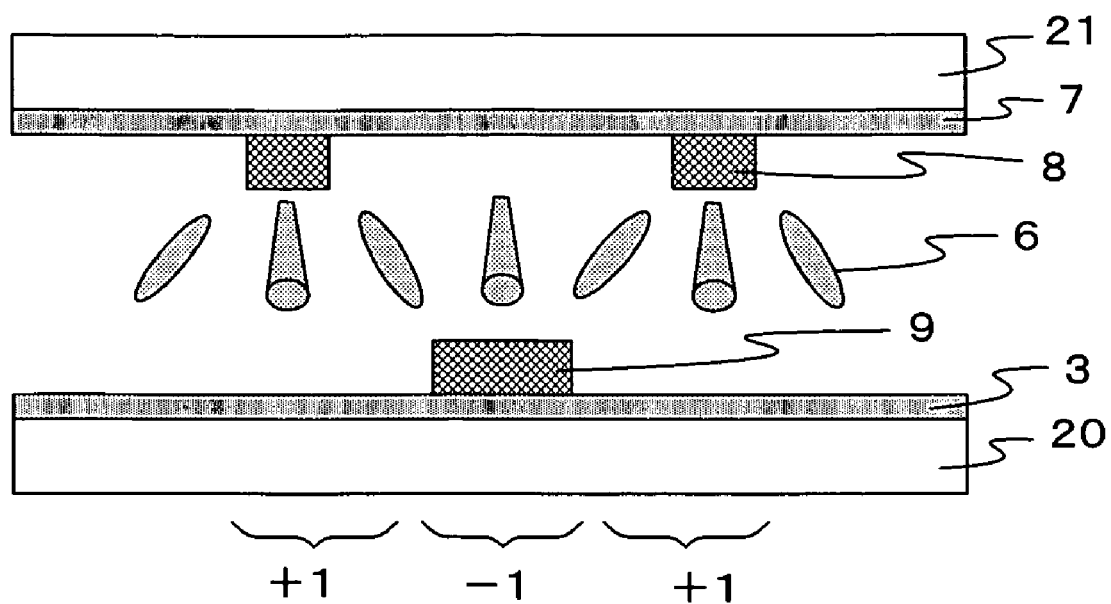
FIG. 3 is a cross-sectional view taken along the line II-II in FIG. 1.
Figure 4:
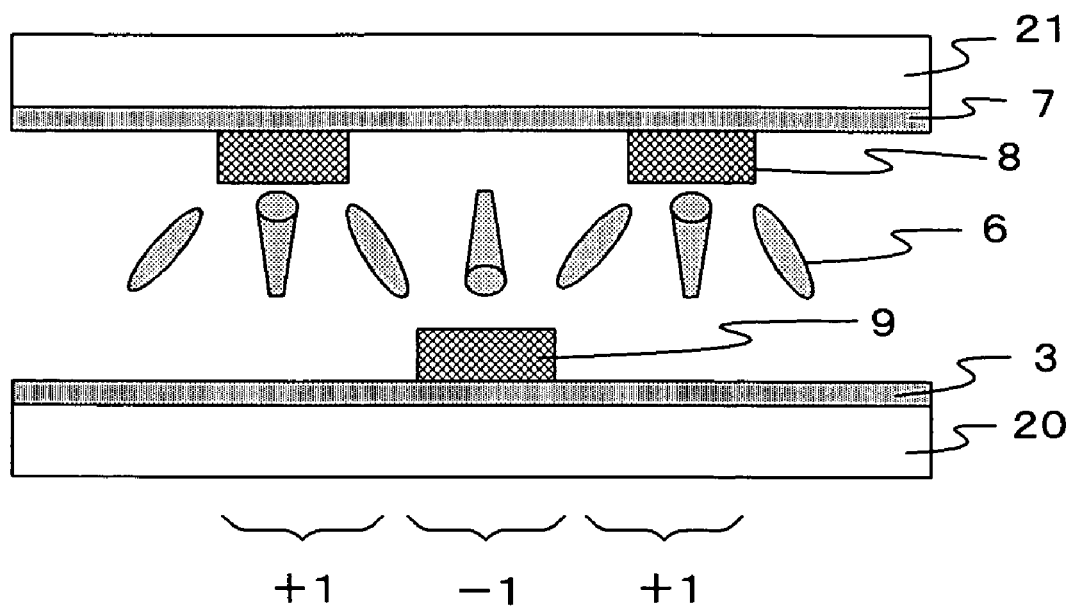
FIG. 4 is a cross-sectional view taken along the line III-III in FIG. 1.
Figure 5:
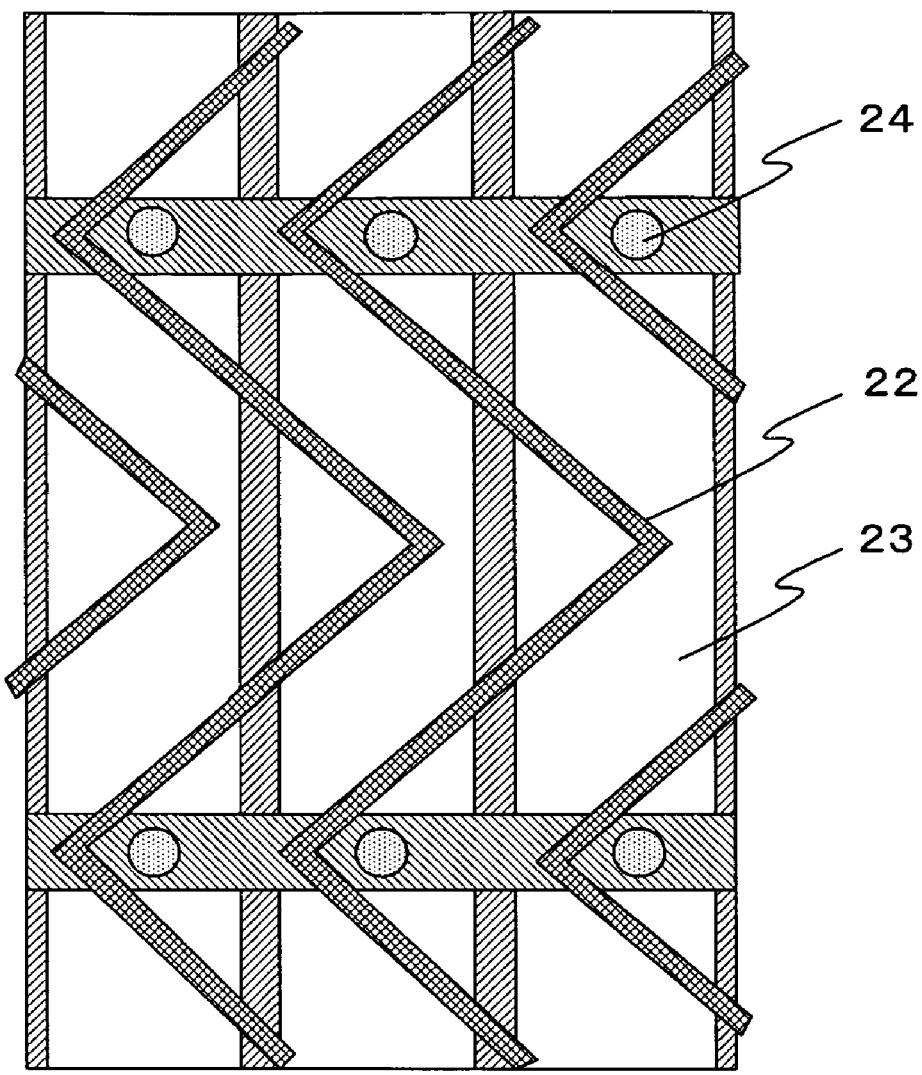
FIG. 5 is a plan view for explaining another example of an alignment control technology of a conventional liquid crystal display device.
Figure 6:
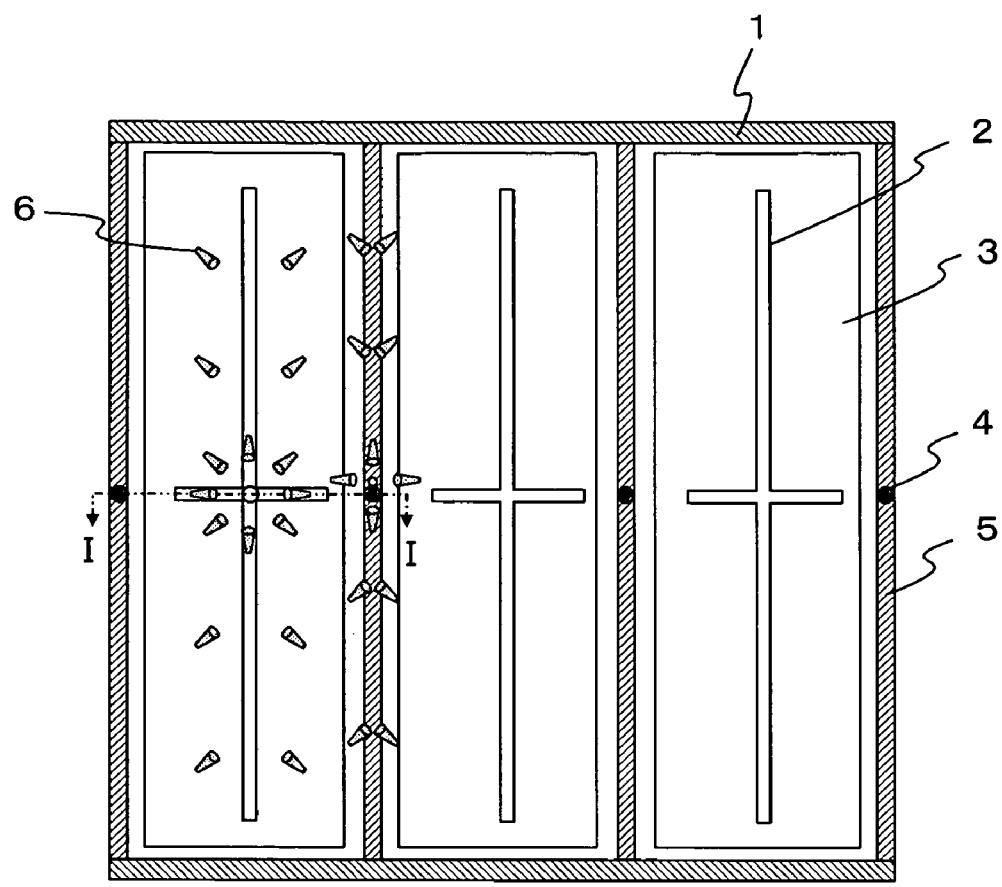
FIG. 6 is a plan view schematically showing a liquid crystal display device according to a first embodiment of the present invention.
Figure 7:
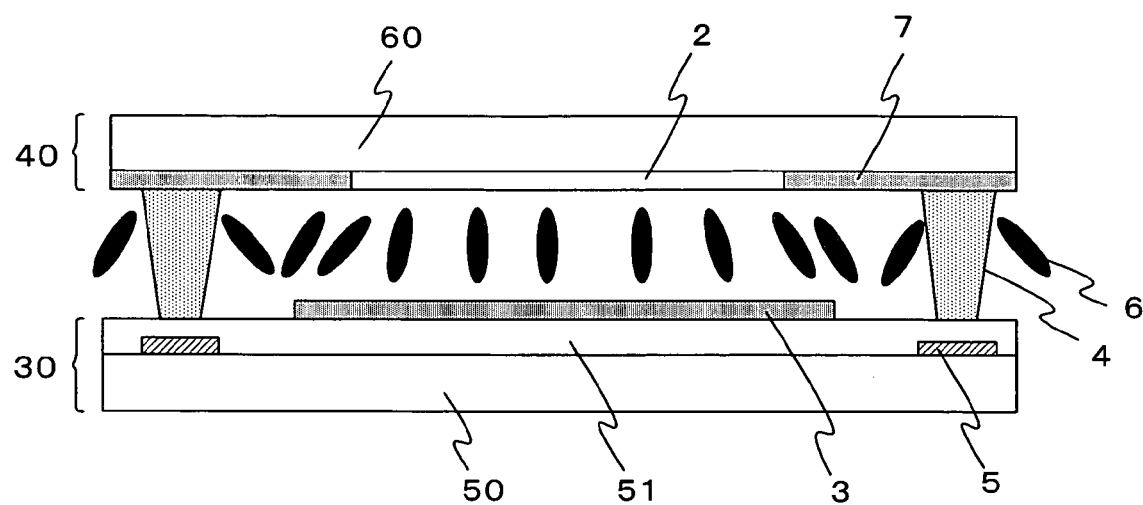
FIG. 7 is a cross-sectional view taken along the line I-I in FIG. 6.

FIG. 6 is a plan view schematically showing a liquid crystal display device according to a first exemplary embodiment of the present invention. FIG. 7 is a cross-sectional view taken along the line I-I in FIG. 6. The liquid crystal display device shown in FIG. 7 is an MVA liquid crystal display device.

This liquid crystal display device has a structure where a liquid crystal layer with negative dielectric anisotropy is inserted between a TFT substrate 30 having a TFT and a counter substrate 40. In addition, the liquid crystal display device shown in FIG. 7 is a transmission liquid crystal display device.

The TFT substrate 30 includes, on a transparent insulation substrate 50, a TFT (not shown) of a switching element, a scanning line 1, and a signal line 5. The scanning line 1 is extended in the lateral direction, while the signal line 5 is extended in the vertical direction. The scanning line 1 and the signal line 5 cross each other through an insulation layer 51. The TFT is provided in the vicinity of a position where the scanning line 1 and the signal line 5 cross each other. The TFT is connected to the scanning line 1, the signal line 5, and a picture electrode 3 that is provided on the transparent insulation layer 51. The insulation layer 51 is formed by a film stack that is composed of a gate insulation film and an interlaminar insulation film. For the gate insulation film and the interlaminar insulation film, a insulation film such as $SiN_x$ can be used. The scanning line 1 and the signal line 5 are insulated therebetween with a gate insulation film.

A desired voltage is applied on the picture electrode 3 through the TFT while controlling the scanning line 1 and the signal line 5. An alignment condition of liquid crystal molecules 6 is controlled with the voltage thus applied. The alignment condition of the liquid crystal molecules 6 allows controlling of the intensity of transmission light.

For the wiring materials of the scanning line 1 and the signal line 5, materials such as aluminum, molybdenum and chromium are used. The picture electrode 3 is composed of a transparent conductive film such as an indium tin oxide film (hereinafter, referred to as ITO film). The picture electrode 3 is formed by patterning, using the photolithography technique and the etching technique, an ITO film that is formed using the sputtering technique.

The counter substrate 40 includes a common electrode 7, which is formed by a transparent conductive film such as an ITO film, on a transparent insulation substrate 60. On the common electrode 7, an electrode non-existing portion (hereinafter referred to as slit), which is formed by removing a part of the common electrode 7, is provided. A slit 2 on the common electrode 7 is formed by patterning a transparent conductive film such as an ITO film which is formed using a technique such as the sputtering technique.

For the liquid crystal display device in the present embodiment, the shape of the slit 2 is a cross, a shape formed by orthogonally intersecting two lines. As in Patent Literature 2, when a waveform protrusion has a triangular waveform, a singular point for the alignment of liquid crystal molecules can be at any position so long as the singular point is on a line of the waveform protrusion, and the position thereof will not be determined, immediately. It is because a final position of the singular point for the alignment of liquid crystal molecules is determined depending the alignment of other surrounding liquid crystal molecules. Meanwhile, even when a line-shaped alignment restriction member is used, since a singular point for the alignment of liquid crystal molecules can be at any position so long as the singular point is on the line-shaped alignment restriction member, it takes a time until the alignment of the liquid crystal molecules is settled. In the present invention, the slit 2 has a shape formed by orthogonally intersecting two lines. In the present invention, an intersecting point of the two lines becomes a singular point. The singular point will determine a final position for the alignment of the liquid crystal molecules.

On the counter substrate 40, a color filter layer and a light shielding (neither shown) are provided. The slit 2 is formed on the common electrode 7, and, thereafter, a photosensitive resin such as acrylic resin is applied on the common electrode 7 to create a film having a predetermined thickness, and is, then, dried. This photosensitive resin is patterned to predetermined position and shape using the photolithography technique and the etching technique to form a columnar spacer 4. The columnar spacer 4 is formed on a counter substrate at a position where, when the TFT substrate 30 and the counter substrate 40 are lapped over each other, the columnar spacer 4 is stacked on the signal line 5, and is located in the middle of the edges of two neighboring cross-shaped slits. In addition, the columnar spacer 4 may be provided on the signal line 5 of the TFT substrate 30 instead of providing on the counter substrate 40. In FIG. 6 and FIG. 7, while the columnar spacer 4 is provided at a position where it is lapped over the signal line 5, the columnar spacer 4 may be provided at a position where it is lapped over the scanning line 1.

For the TFT substrate 30 and the counter substrate 40 which can be obtained in the above-described manner, on the surfaces thereof, a vertical alignment film (not shown) is formed. The vertical alignment film is a film for causing liquid crystal molecules to be vertically aligned on a substrate.

For the vertical alignment film, a polyimide film or a polyamic acid can be used.

Liquid crystal with negative dielectric anisotropy is filled in between the TFT substrate 30 and the counter substrate 40 using an injection method or one drop filling-bonding method. When this operation is performed, the distance between the TFT substrate 30 and the counter substrate 40 is held constant with a columnar spacer 4 formed on the counter substrate 40.

On the outer faces of both substrates, polarization plates are provided. As a polarization plate, it is possible to use one on which an optical film is laminated, the optical film exhibiting that its double refraction be negative uniaxial, or on which a biaxially oriented film is laminated. When adopting a liquid crystal display device that serves both as a reflection type and a transmission type, it is possible to use one as a polarization plate, where a polarization plate, a half wavelength plate, and a quarter wavelength plate are laminated. In this manner, an MVA liquid crystal display device can be manufactured.

A specific example for the liquid crystal display device of the present embodiment is described with reference to FIG. 6 and FIG. 7. First, a method of manufacturing the TFT substrate 30 which is the first substrate is described. Repeating deposition and patterning according to a common TFT forming process, there were formed on the transparent insulation substrate 50 a scanning line 1 and a scanning electrode, a common storage line, an auxiliary capacitance electrode, a gate insulation film, a semiconductor layer, a signal line 5, and a source/drain electrode. For the transparent insulation substrate 50, a glass substrate, a plastic substrate, or a substrate formed by bonding both substrates can be used.

Then, an interlaminar insulation film for covering the above substrates was formed. Subsequently, an ITO film was formed on the interlaminar insulation film (insulation layer 51 in FIG. 6) using the sputtering technique. Patterning this ITO film using the photolithography technique and the etching technique, the picture electrode 3 was formed. A cycle of repetition of the picture electrode 3 was set as 110 μm in the direction of the scanning line 1, and 330 μm in the direction of the signal line 5. The picture electrode 3 is connected to the TFT through a contact hole. The distance from the end of the picture electrode 3 to the end of the signal line 5 was set as 6 μm. The shape of the picture electrode 3 is symmetric or nearly symmetric. For example, there are a square and a rectangle as symmetric shapes.

Next, a method of manufacturing the counter substrate 40 which is the second substrate is described. On a transparent insulation substrate 60 such as a glass substrate, a light shielding layer and a color filter layer are formed according to a common process. On the color filter layer, an over coat layer of 1 μm in thickness is formed using a thermo-set resin. The reason why the over coat layer was formed is to even out unevenness on the color filter layer. On the over coat layer, an ITO film is formed using the sputtering technique, and the common electrode 7 is formed. The slit 2 where no electrode portion exists was formed on a predetermined part of the common electrode 7 by patterning the ITO thus formed using the photolithography technique and the etching technique. The slit 2 has a cross-shape, as shown in FIG. 6, a shape formed by orthogonally intersecting two lines. The width of the slit 2 is preferably set to be not less than 6 μm and not larger than 12 μm. When the width of the slit is less than 6 μm, the division alignment of liquid crystal molecules does not become stable. While the width of the slit 2 can be greater than 12 μm, the efficiency of use of light is impaired. After patterning the common electrode 7, a photosensitive acrylic resin was applied on the counter substrate 40, dried, and was patterned using the photolithography technique and the etching technique to form a columnar spacer 4. For the photosensitive acrylic resin, one with a relative permittivity of 3 was used.

An elastic compressibility of the columnar spacer 4 after formation is about 160 kg/mm$^2$ to 200 kg/mm$^2$.

The height of the columnar spacer 4 is determined by considering the coating thickness of the photosensitive acrylic resin, shrinkage due to drying, the reduction of the film thickness due to patterning, shrinkage occurred in a panel process, and the like. The height of the columnar spacer 4 was adjusted so that a cell gap becomes 4.0 μm after completing the panel process. The columnar spacer 4 has substantially the shape of a square pole. Of the upper base and the lower base of the columnar spacer 4, one that is closer to a substrate is referred to as the lower base. Here, the shape of the upper base was put as a square having a side with a length of 12 μm. Thus, the area of one upper base is 144 μm$^2$. The density of the columnar spacer 4 is 3967 μm$^2$ when it is expressed in terms of the area of a picture element, 1 mm$^2$. In this way, the columnar spacer 4 was formed, hence obtaining the counter substrate 40. As a columnar spacer, a hexagonal pole and an octagonal pole may be used other than the square pole.

The TFT substrate 30 and the counter substrate 40 are formed in the above-described manner, and, on the surfaces thereof, vertical alignment films are formed. For the vertical alignment film, for example, a polyimide alignment material JALS-2100 of JSR Corporation can be used. For a liquid crystal material, MLC-6608 of Merck Ltd. can be used. A liquid crystal material is filled between the TFT substrate 30 and the counter substrate 40 according to the one drop filling method, thus obtaining an MVA liquid crystal display device.

At this time, the end of the slit 2, the end of the picture electrode 3, and the columnar spacer 4 are located in a positional relation as shown FIG. 6 and FIG. 7. The columnar spacer 4 is disposed in the middle of two cross-shaped slits 2. As was previously described, the distance between the end of the signal line 5 and the end of the picture electrode 3 is 6 µm, while the distance between the end of the picture electrode 3 and the end of the cross-shaped slit 2 is 8 µm.

When a voltage is applied between the picture electrode 3 and the common electrode 7, an electric field having different directions on both sides of the slit 2 occurs.

This electric field is referred to as a diagonal electric field. This electric filed controls the directions where liquid crystal molecules fall down in two directions. When the slit 2 is a cross-shaped one, the directions where liquid crystal molecules fall down can be controlled to four directions. Hence, the directions of the alignment of liquid crystal molecules can be divided into four divided domains, where, for every two neighboring domains, these two domains are oriented to the corresponding directions which are different by 90 degrees. When the angle of the lateral and right direction is set as 0 degree, the four domains are those which are oriented to the directions of 45 degrees, 135 degrees, 225 degrees, and 315 degrees. The directions along the slits of the cross-shape, that is 0 degree, 90 degrees, 180 degrees, and 270 degrees, are ignored, since there is no large contribution to transmissivity. Since the use of the cross-shaped slit 20 enables the directions of liquid crystal molecules to be divided in four domains, the angle field of view becomes wide.

Figure 8:
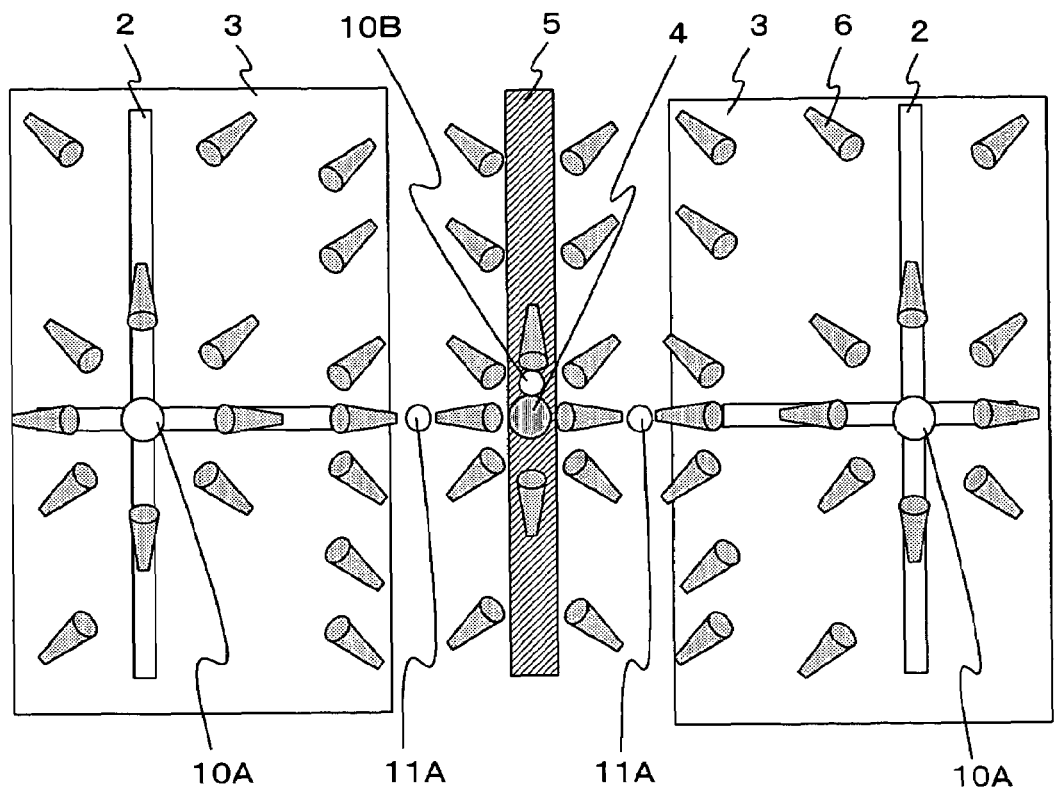
FIG. 8 is a plan view for explaining an alignment control technology for the liquid crystal display device in FIG. 6.

FIG. 8 is a diagram for explaining an alignment control technology of the liquid crystal display device in FIG. 6, and is a plan view of a face of a substrate of the liquid crystal display device when viewing the face thereof in the direction perpendicular thereto. As shown in FIG. 8, a singular point of the alignment of liquid crystal molecules on the signal line 5 is determined depending on the columnar spacer 4 and the cross-shaped slit 2, or the columnar spacer 4. That is, a singular point 10A of +1 occurs in the middle of the cross-shaped slit 2, while a singular point 10B of +1 occurs in the vicinity of the columnar spacer 4. Moreover, a singular point 11A of −1 occurs between the end of the picture electrode 3 and the end of the signal line 5. When pressing a panel surface, re-aligning of the alignment of the liquid crystal molecules occurs in a display area, where the singular point 10A of +1 occurred in the middle of the cross-shaped slit 2 is as a base point. On the signal line 5, re-aligning of the alignment of the liquid crystal molecules occurs where the singular point 10B of +1 occurred in the vicinity of the columnar spacer is as a base point. When the end of the picture electrode 3, the columnar spacer 4, and the cross-shaped slit 2 are put in this positional relation, the liquid crystal molecules 6 aligned in the directions of 0 degree, 90 degrees, 180 degrees, and 270 degrees become those in the cross-shaped slit 2 portion, and the area between the picture electrode 3 and the signal line 5, hence not impairing the efficiency of use of light.

When no columnar spacer is provided on the signal line 5, it would take three to four seconds until settled since there is no definite determining means for determining the position of a singular point. As a singular point on wiring moves, the liquid crystal molecules on a display portion also move, hence visually exhibiting a wavy alignment irregularity.

While the above description for the liquid crystal display device of the present embodiment is for a transmission liquid crystal display device, the present embodiment is applicable to a transmission part in a semi-transmission liquid crystal display device.

An example where the technology for the liquid crystal display device of the present embodiment is applied to a semi-transmission liquid crystal display device is described with reference to FIG. 9.

Figure 9:
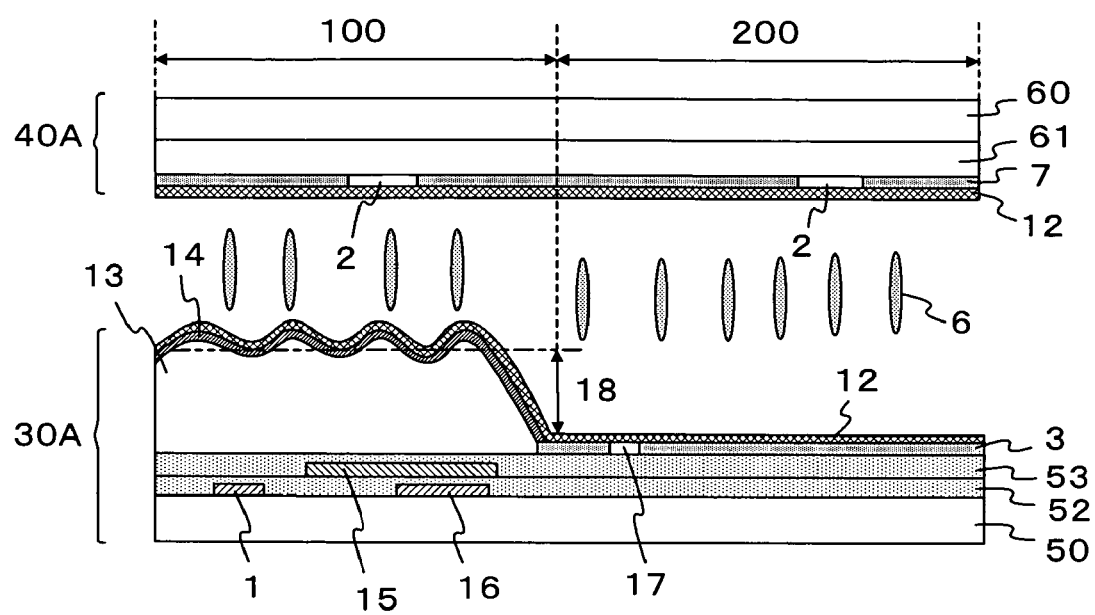
FIG. 9 is a cross-sectional view for explaining an example where the alignment control technology for the liquid crystal display device in FIG. 6 is adopted to a semi-transmission liquid crystal display device.
Figure 10:
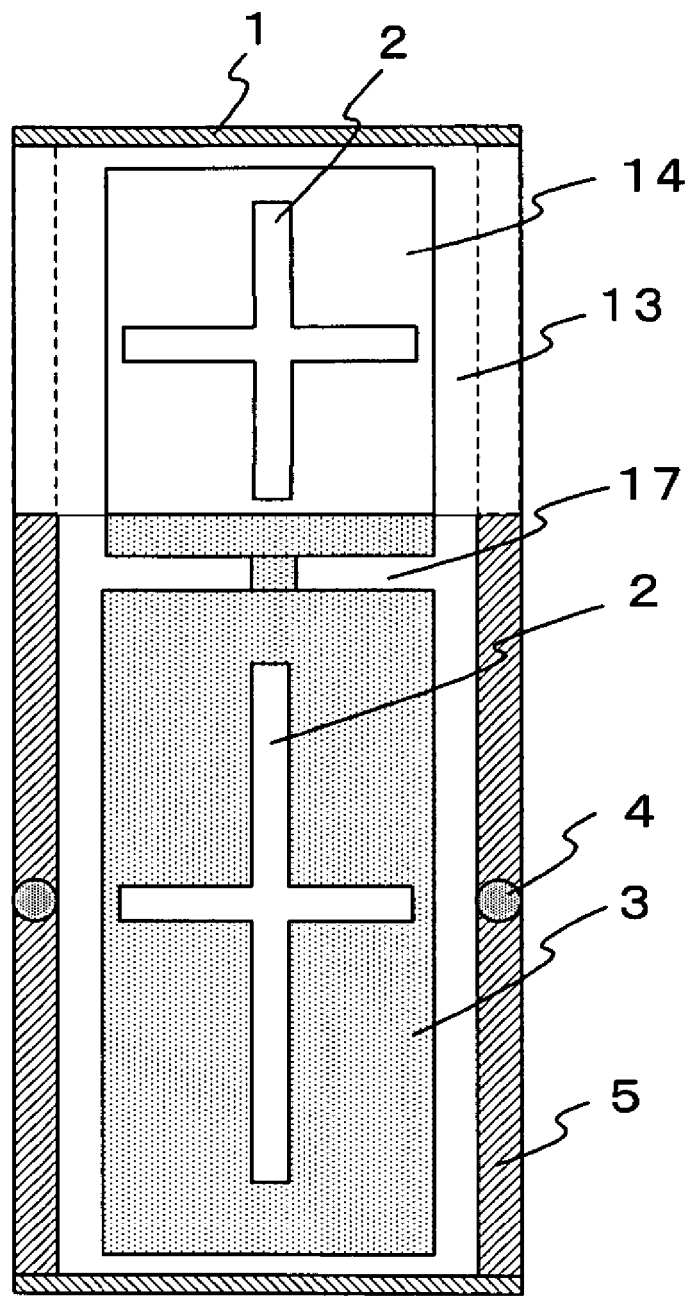
FIG. 10 is a plan view showing a shape of a picture electrode of the liquid crystal display device in FIG. 9.

Referring to FIG. 9, a TFT substrate 30A includes a transparent insulation substrate 50 such as a glass substrate on which there are formed a scanning line 1 and a scanning electrode, a common storage line, an auxiliary capacitance electrode 16, a gate insulation film 52, a semiconductor layer, a signal line, and a source/drain electrode 15. In addition, a transparent insulation film 53, which covers the above, is formed. On the TFT substrate 30A of a transparent domain 200, a picture electrode 3 of a transparent conductive film, which is formed by an ITO film and the like, is formed. The shape of the picture element 3 is substantially rectangular as shown in FIG. 10. The picture electrode 3 includes an electrode non-existing portion 17 formed at a part thereof.

The distance between the end of the picture electrode 3 and the end of the signal line is 6 µm.

On a reflection domain 100 of the TFT substrate 30A, an irregularity film 13 is formed. On the surface thereof, a reflection electrode 14 is formed, hence forming a reflection part. On the reflection part and the transmission part of the TFT substrate 30A, a step 18 is formed.

On a counter substrate 40A, a light shielding layer and a color filter layer (neither shown) are formed on a transparent insulation substrate 60 such as a glass substrate.

In addition, an over coat layer 61 is formed on the color filter layer. On the over coat layer 61, a common electrode 7 formed by a transparent conductive film such as an ITO film is formed. A cross-shaped slit 2, which is an electrode non-existing portion, is formed at a predetermined part of the common electrode 7.

A method of forming the reflection part of the TFT substrate 30A is described. After forming the picture electrode 3 on the transparent insulation film 53, a photosensitive acrylic resin is applied on the TFT substrate 30A, and dried. This is patterned using the photolithography technique and the etching technique with a half-tone mask, forming the irregularity film 13. On the irregularity film 13, the reflection electrode 14 made of metal such as Al/Mo is patterned and formed a reflection part. When working on this, an average height of the transmission part (where the photosensitive acrylic resin is completely removed) and the reflection part was set 2 µm.

Figure 11:
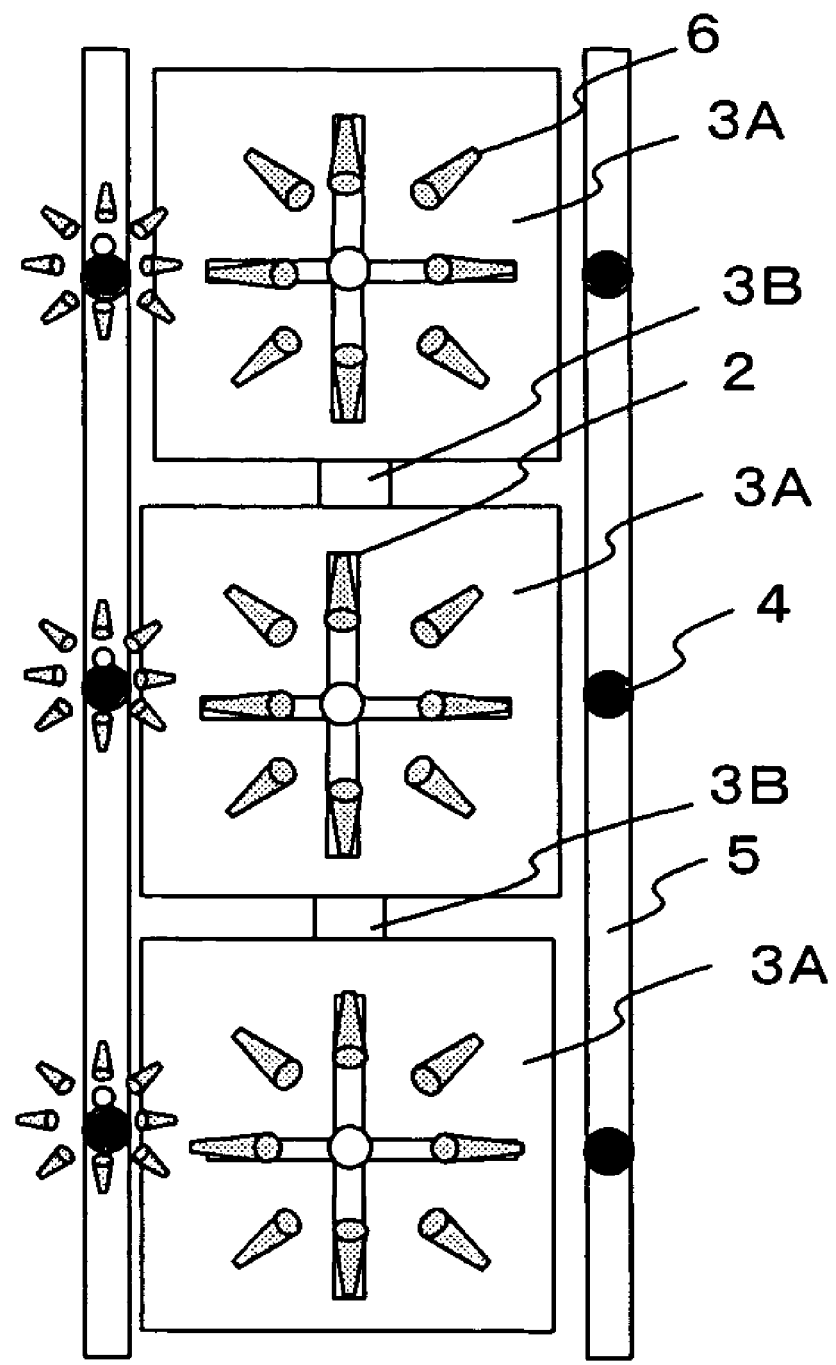
FIG. 11 is a plan view for explaining an alignment control technology for a liquid crystal display device according to a second embodiment of the present invention.

Next, a method of forming the counter substrate 40A is described. First, a light shielding layer and a color filter layer are formed on the transparent insulation substrate 60 such as a glass substrate by following a common process. On the color filter layer, an over coat layer 61 of 1 µm in thickness is formed using a thermo-set resin. On the over coat layer 61, an ITO film is formed using the sputtering technique, forming the common electrode 7. This is patterned by using the photolithography technique and the etching technique, forming the electrode non-existing portion at a predetermined part of the common electrode 7. The shape of the slit 2 is a cross, as shown in FIG. 11, a shape formed by intersecting two line-shaped slits. The cross-shape of the slit 2 is made that the vertical slit is longer, so as to quadrisect in plane the area of the rectangular picture electrode 3 of the transmission part. The width of the slit is set to be not less than 6 µm and not larger than 12 µm.

After patterning the common electrode 7, a photosensitive acrylic resin is applied on the counter substrate, and dried. This is patterned using the photolithography technique and the etching technique, forming the columnar spacer 4. The height of the columnar spacer 4 is adjusted so that a cell gap becomes 4.0 µm after completing a panel process. The columnar spacer 4 has substantially the shape of a square pole. Of the upper base and the lower base of the pole, one that is closer to a substrate is referred to as the lower base. Here, the shape of the upper base was put as a square having a side with a length of 12 μm. In this way, the counter substrate 40A where the columnar spacer is formed is obtained.

And the TFT substrate 30A and the counter substrate 40A are formed in the above-described manner, and, on the surfaces thereof, vertical alignment films 12 are formed. For the vertical alignment film 12, for example, a polyimide alignment material JALS-2100 of JSR Corporation can be used. For a liquid crystal, material, MLC-6608 of Merck Ltd. can be used. A liquid crystal material is filled between the TFT substrate 30A and the counter substrate 40A according to the one drop filling and bonding method, thus obtaining an MVA liquid crystal display device. As a polarization plate, one where a polarization plate, a half wavelength plate, and a quarter wavelength plate are laminated was used (not shown).

In this way, an MVA liquid crystal display device was obtained.

At this time, the end of the slit 2, the end of the picture electrode, and the columnar spacer are located in a positional relation similar to those in FIG. 6 and FIG. 7.

The columnar spacer 4 is disposed in the middle of two cross-shaped slits 2. As was previously described, the distance between the end of the signal line 5 and the end of the picture electrode 3 is 6 μm, while the distance between the end of the picture electrode 3 and the end of the cross-shaped slit 2 is 8 μm.

When a voltage is applied between the picture electrode 3 and the common electrode 7, a diagonal electric field occurs due to the presence of the cross-shaped slit 2. Because of the effect due to this electric field, the directions of the alignment of liquid crystal molecules can be divided into four divided domains. When the angle of the lateral and right direction is set as 0 degree, the four domains are those which are oriented to the directions of 45 degrees, 135 degrees, 225 degrees, and 315 degrees. The directions along the slits of the cross-shape, that is 0 degree, 90 degrees, 180 degrees, and 270 degrees, are ignored, since there is no large contribution to transmissivity. Since dividing into the four domains was made possible, the angle field of view becomes wide.

A singular point of the alignment of liquid crystal molecules on wiring is determined due to the effect of the columnar spacer 4 in a similar way to that in FIG. 8. That is, a singular point 10A of +1 occurs in the middle of the cross-shaped slit 2, while a singular point 10B of +1 occurs in the vicinity of the columnar spacer 4. Moreover, a singular point 11A of −1 occurs between the end of the picture electrode 3 and the end of the signal line 5 (wiring electrode). When pressing a panel surface with a finger, re-aligning of the alignment of the liquid crystal molecules occurs in a display area at the singular point of +1 as a base point of the singular point having occurred in the middle of the cross-shaped slit 2. On the wiring electrode, re-aligning of the alignment of the liquid crystal molecules occurs at the singular point of +1 as a base point of the singular point having occurred in the vicinity of the columnar spacer.

Next, a liquid crystal display device in a second exemplary embodiment of the present invention is described. While a basic configuration of the liquid crystal display device in the second embodiment is similar to that of the liquid crystal display device in the first embodiment, it is different in a point where a picture electrode in one picture region is divided.

FIG. 11 is a diagram for explaining an alignment control technology of the liquid crystal display device in the second exemplary embodiment, and is a plan view of a face of a substrate of the liquid crystal display device when viewing the face thereof in the direction perpendicular thereto.

In FIG. 11, a picture electrode in a picture element domain is divided into three sub-picture electrodes 3A along a signal line 5. Each sub-picture electrode 3A is desirable to have a symmetry-like shape, which is more like a square of a rectangle. Three sub-picture electrodes 3A are electrically connected one another through tiny connection electrodes 3B formed by an ITO film, and becomes equipotential when they are given electric potentials with a switching element. When the sub-picture electrodes 3A are too large, a response time becomes longer, while, when it is too small, the area of a slit occupying in the picture electrode becomes relatively too large, hence impairing the efficiency of use of light. Therefore, a side of the sub-picture electrode 3A is set to have the length which is normally and approximately from 30 μm to 80 μm.

On a common electrode of a counter substrate, one cross-shaped slit 2 is provided opposite to each of the three sub-picture electrodes 3A. The cross-shaped slit 2 is provided so that its center occupies a position same as that of the center of the picture electrode 3A. A columnar spacer 4 is formed on a counter substrate at a position where, when a TFT substrate and a counter substrate are lapped over each other, the columnar spacer 4 is laid on a signal line 5, and is located in the middle of the edges of two neighboring cross-shaped slits 2. The shape of the upper base is a square with a side of 10 μm. That is, the upper base of one columnar spacer has an area of 100 μm². The area of the upper bases of the columnar spacers occupies 300 μm² for one picture electrode, doubling, thus the area of the lower base in terms of a unit area increases almost twice compared with the example of the first embodiment. Therefore, the alignment of liquid crystal molecules became more stable when a panel surface was depressed. Alternatively, in the above second embodiment of the present invention, a columnar spacer 4 can be provided on the TFT substrate instead of providing it on the counter substrate.

In the liquid crystal display device of the second embodiment of the present invention, while the picture electrode is divided into the three sub-picture electrodes 3A along the signal line 5, it is also possible to divide the picture electrode along a scanning line, or to divide the picture electrode in the vertical and horizontal directions with both lines. The columnar spacer is disposed at a position where it is lapped over the scanning liner or the signal line.

Next, a liquid crystal display device in a third exemplary embodiment of the present invention is described.

A basic configuration of the liquid crystal display device of the third embodiment is similar to that of the second embodiment. The third embodiment is different to the second embodiment in that, in the third embodiment, instead of providing a slit on a common electrode, a cross-shaped protruding structure is provided on a common electrode disposed at a position where the common electrode laps over a picture electrode, while a quadrate protruding structure is provided on a common electrode disposed at a position where the common electrode laps over a signal line. In the present embodiment, a columnar spacer 4 is located on a TFT substrate.

Figure 12:
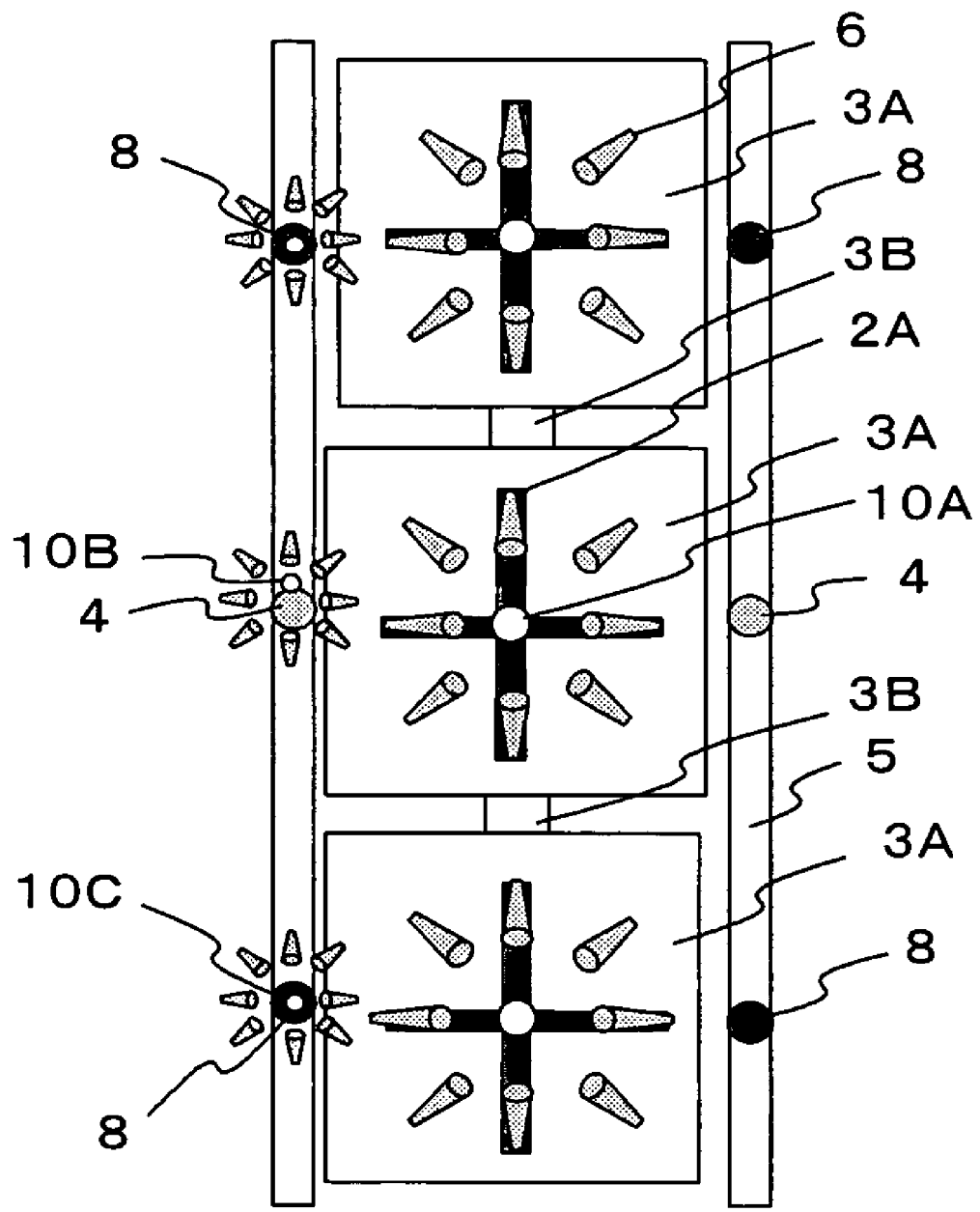
FIG. 12 is a plan view for explaining an alignment control technology for a liquid crystal display device according to a third embodiment in the present invention.

FIG. 12 is a diagram for explaining an alignment control technology of the liquid crystal display device in the third embodiment, and is a plan view of a face of a substrate of the liquid crystal display device when viewing the face thereof in the direction perpendicular thereto. Referring to FIG. 12, the liquid crystal display device of the present embodiment is described. As is similar to the first embodiment, there were formed a scanning line and a scanning electrode, a common storage line, an auxiliary capacitance electrode, a gate insulation film, a semiconductor layer, a signal line, and a source/drain electrode. A transparent insulation film was formed to cover all the above. Subsequently, sub-picture electrodes 3A were formed in such a method that three electrodes each having a shape close to be symmetric (a rectangle close to a square) are successively provided. Then, a photosensitive acrylic resin was applied on a TFT substrate, and dried. This was patterned using the photolithography technique and the etching technique, forming a columnar spacer 4.

A height of the columnar spacer 4 was adjusted so that, when completing a panel, a cell gap is 4 µm. A position where the columnar spacer 4 is set is described later. Meanwhile, an elastic modulus of the columnar spacer 4 is the same as that in the first embodiment.

Next, a method of manufacturing a counter substrate, which is a second substrate, is described. A light shielding layer and a color filter are formed on a glass substrate according to a common process. On the color filter layer, the over coat layer of 1 µm in thickness is formed using a thermo-set resin. The reason why the over coat layer was formed is to even out unevenness on the color filter layer. An ITO film is formed on the over coat layer using the sputtering technique, thus forming a common electrode. A photosensitive acrylic resin was applied thereon, and dried. This was patterned by using the photolithography technique and the etching technique, forming a cross-shaped protruding structure 2A and a quadrate protruding structure 8. The cross-shaped protruding structures 2A were provided on the counter substrate so as to respectively face three sub-picture electrodes 3A. Each of the cross-shaped protruding structures 2A is provided so that its center occupies a position same as that of the center of the picture electrode 3A having a shape close to be symmetric. The cross-shaped protruding structure 2A is 8 µm wide and 1.9 µm high. The quadrate protruding structure 8 is a square with a side of 10 µm, and is 1.9 µm high. The quadrate protruding structure 8 is formed at a position where, when the TFT substrate and the counter substrate are lapped over each other, the quadrate protruding structure 8 is laid on a signal line 5, and is located in the middle of the edges of two neighboring cross-shaped protruding structures 2A. The quadrate protruding structure 8 is not formed on the center row among the three cross-shaped protruding structures which are vertically lined up.

The columnar spacer 4 is located at a position which is in the middle of the ends of two neighboring cross-shaped protruding structures, and which is on the center row among the three cross-shaped protruding structures which are vertically lined up. The quadrate protruding structure 8 and the columnar spacer 4 are not formed on the same place.

The TFT substrate and the counter substrate are formed in the above-described manner, and, on the surfaces thereof, vertical alignment films are formed. For the vertical alignment film, for example, a polyimide alignment material JALS-2100 of JSR Corporation can be used. For a liquid crystal material, MLC-6608 of Merck Ltd. can be used. A liquid crystal material is filled between the TFT substrate and the counter substrate according to the one drop filling and bonding method, thus obtaining an MVA liquid crystal display device.

When a voltage is applied between the sub-picture electrode 3 and the common electrode, an equipotential line is bent at the insulation protruding structure 2A, causing a diagonal electric field. Because of the effect of this electric field, it was possible to form four domains every two neighboring domains having liquid crystal molecules whose directions of the alignment are different by 90 degrees, hence providing a wide angle field of view becomes wide.

Because of the effect of the columnar spacer 4 and the quadrate protruding structure 8, the position of the singularity is determined as shown in FIG. 12. That is, a singular point 10A of +1 occurs in the vicinity of the columnar spacer 4, while a singular point 10C of +1 occurs on the quadrate protruding structure 8. Moreover, a singular point of −1 (not shown) occurs between the end of the picture electrode 3A and the end of the signal line 5. When pressing a panel surface with a finger, re-aligning of the alignment of the liquid crystal molecules occurs in a display area at the singular point of +1 as a base point of the singular point having occurred in the middle of the cross-shaped protruding structure 2A.

On the signal line 5, re-aligning of the alignment of the liquid crystal molecules quickly occurs at the singularity of +1 as a base point of the singularity having occurred in the vicinity of the columnar spacer 4 and on the quadrate protruding structure 8. In this manner, an MVA liquid crystal display device can be obtained where re-aligning of the alignment of the liquid crystal molecules quickly occurs even if a pressure is externally applied on a panel. The MVA liquid crystal display device of the present embodiment is applicable not only to a transparent type but also to a semitransparent MVA liquid crystal display device. Furthermore, in the above third embodiment of the present invention, the columnar spacer 4 can be placed on the counter substrate instead of on the TFT substrate.

In the liquid crystal display device of the above third embodiment of the present invention, instead of the slit 2, the cross-shaped protruding structure may be provided on the common electrode. In the liquid crystal display device of the above third embodiment of the present invention, while the picture electrode is divided into the three sub-picture electrodes 3A along the signal line 5, the picture electrode can be divided along a scanning line, or the picture electrodes can be divided along the both lines in the vertical and horizontal directions. The columnar spacer is located at a position where it is lapped over the scanning liner or the signal line. While the protruding structure 8 is provided on the side of the counter substrate, same as that for the cross-shaped protruding structure 2A, the protruding structure 8 can be provided at a position where the protruding structure 8 does not lap over the columnar spacer, on the signal line on the scanning line on the TFT side opposite to the cross-shaped protruding structure 2A. Moreover, it is apparent that the liquid crystal display device of the above third embodiment of the present invention can be applied to the case where a picture electrode is not divided.

While this invention has been described in connection with certain preferred embodiments, it is to be understood that the subject matter encompassed by way of this invention is not to be limited to those specific embodiments. On the contrary, it is intended for the subject matter of the invention to include all alternatives, modification, and equivalents as can be included within the spirit and scope of the following claims.

What is claimed is:

1. A vertical alignment liquid crystal display device, comprising:

a first substrate provided with a wiring part, picture electrodes, switching elements and a columnar spacer, the wiring part being formed by a plurality of signal lines and a plurality of scanning lines both crossing each other, the picture electrodes comprising a plurality of sub-picture electrodes provided respectively in regions zoned with the signal lines and the scanning lines, the switching elements being associated with picture elements, and the columnar spacer being provided on the wiring part;

a second substrate with a common electrode disposed so as to face the first substrate, the common electrode being provided with a cross-shaped first alignment restriction member including a lengthwise portion and a transverse portion intersecting the lengthwise portion; and a liquid crystal layer with negative dielectric an isotropy held between the first substrate and the second substrate, wherein the cross-shaped first alignment restriction member is arranged so as to restrict an alignment of liquid crystal molecules of the liquid crystal layer when a voltage is applied between the picture electrode and the common electrode, and wherein said first alignment restriction member comprises plural first alignment restriction members disposed so as to face the plurality of sub-picture electrodes, respectively, the signal lines comprise a signal line formed between the plurality of sub-picture electrodes, and said columnar spacer is formed on the signal line between two first alignment restriction members of said plural first alignment restriction members and on an extended line of said transverse portion of said two first alignment restriction members.

2. The liquid crystal display device according to claim 1, wherein the plurality of sub-picture electrodes are provided in succession.

3. The liquid crystal display device according to claim 1, wherein the picture electrode has a symmetric shape.

4. The liquid crystal display device according to claim 1, wherein the columnar spacer is provided on the second substrate.

5. The liquid crystal display device according to claim 1, wherein the columnar spacer is provided on the first substrate.

6. The liquid crystal display device according to claim 1, wherein a position of the wiring part at which the columnar spacer is provided is located in the middle of the two neighboring first alignment restriction members.

7. The liquid crystal display device according to claim 1, wherein the first alignment restriction member which is provided on the common electrode comprises an electrode non-existing portion of the common electrode.

8. The liquid crystal display device according to claim 7, wherein the non-existing portion has a width which is set to be not less than 6 µm and not larger than 12 µm.

9. The liquid crystal display device according to claim 1, wherein the first alignment restriction member provided on the common electrode comprises a protruding structure.

10. The liquid crystal display device according to claim 1, wherein the columnar spacer is formed by a photosensitive acrylic resin.

11. The liquid crystal display device according to claim 1, wherein the first alignment restriction member is formed by using a photosensitive acrylic resin.

12. The liquid crystal display device according to claim 1, wherein a reflection part, which reflects light entering through the second substrate, is provided on the first substrate in the area of a picture element including the picture electrode.

13. The liquid crystal display device according to claim 1, wherein said two first alignment restriction members comprise two neighboring first alignment restriction members, and wherein said columnar spacer is formed midway between said two neighboring first alignment restriction members.

14. The liquid crystal display device according to claim 1, wherein said transverse portion of said two first alignment restriction members is parallel to said plurality of scanning lines and perpendicular to said plurality of signal lines.

15. The liquid crystal display device according to claim 1, wherein said plural cross-shaped first alignment restriction members comprise a cross-shaped slit formed in said common electrode, and wherein said transverse portion comprises a transverse slit formed in said common electrode.

16. A vertical alignment liquid crystal display device, comprising:

a first substrate provided with a wiring part, picture electrodes, switching elements and a columnar spacer, the wiring part being formed by a plurality of signal lines and a plurality of scanning lines both crossing each other, the picture electrodes comprising a plurality of sub-picture electrodes provided respectively in regions zoned with the signal lines and the scanning lines, the switching elements being associated with picture elements, and the columnar spacer being provided on the wiring part;

a second substrate with a common electrode disposed so as to face the first substrate, the common electrode being provided with a cross-shaped first alignment restriction member including a lengthwise portion and a transverse portion intersecting the lengthwise portion; and a liquid crystal layer with negative dielectric anisotropy held between the first substrate and the second substrate, wherein the cross-shaped first alignment restriction member is arranged so as to restrict an alignment of liquid crystal molecules of the liquid crystal layer when a voltage is applied between the picture electrode and the common electrode, wherein said columnar spacer is formed near a singular point of alignment of said liquid crystal molecules, wherein the first alignment restriction member provided on the common electrode comprises a protruding structure, wherein said first alignment restriction member comprises plural first alignment restriction members disposed so as to face the plurality of sub-picture electrodes, respectively, the signal lines comprise a signal line formed between the plurality of sub-picture electrodes, and said columnar spacer is formed on the signal line between two first alignment restriction members of said plural first alignment restriction members and on an extended line of the transverse portion of said two first alignment restriction members, and wherein a second alignment restriction member, which comprises a protruding structure for restricting an alignment of the liquid crystal molecules, is formed on the common electrode and is located at a position such that the second alignment restriction member overlaps the signal line or the scanning line and is beside the columnar spacer.

17. The liquid crystal display device according to claim 16, wherein the second alignment restriction member is formed by using a photosensitive acrylic resin.

18. A vertical alignment liquid crystal display device, comprising:

a first substrate provided with a wiring part, picture electrodes, switching elements and a columnar spacer, the wiring part being formed by a plurality of signal lines and a plurality of scanning lines both crossing each other, the picture electrodes comprising a plurality of sub-picture electrodes provided respectively in regions zoned with the signal lines and the scanning lines, the switching elements being associated with picture elements, and the columnar spacer being provided on the wiring part;

a second substrate with a common electrode disposed so as to face the first substrate, the common electrode being provided with a cross-shaped first alignment restriction member including a lengthwise portion and a transverse portion intersecting the lengthwise portion; and a liquid crystal layer with negative dielectric anisotropy held between the first substrate and the second substrate, wherein the cross-shaped first alignment restriction member is arranged so as to restrict an alignment of liquid crystal molecules of the liquid crystal layer when a voltage is applied between the picture electrode and the common electrode, wherein said columnar spacer is formed near a singular point of alignment of said liquid crystal molecules, wherein the first alignment restriction member provided on the common electrode comprises a protruding structure, wherein said first alignment restriction member comprises plural first alignment restriction members disposed so as to face the plurality of sub-picture electrodes, respectively, the signal lines comprise a signal line formed between the plurality of sub-picture electrodes, and said columnar spacer is formed on the signal line between two first alignment restriction members of said plural first alignment restriction members and on an extended line of the transverse portion of said two first alignment restriction members, and wherein a second alignment restriction member, which comprises a protruding structure for restricting an alignment of the liquid crystal molecules, is formed on the signal line or the scanning line and is beside the columnar spacer.

* * * * *